(12) United States Patent
Bai

(10) Patent No.: US 12,079,308 B1
(45) Date of Patent: Sep. 3, 2024

(54) MITIGATING REALITY GAP THROUGH MODIFICATION OF SIMULATED STATE DATA OF ROBOTIC SIMULATOR

(71) Applicant: GOOGLE LLC, Mountain View, CA (US)

(72) Inventor: Yunfei Bai, Fremont, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/244,754

(22) Filed: Sep. 11, 2023

Related U.S. Application Data

(60) Division of application No. 17/896,519, filed on Aug. 26, 2022, now Pat. No. 11,790,042, which is a continuation of application No. 16/267,077, filed on Feb. 4, 2019, now Pat. No. 11,461,589.

(51) Int. Cl.
| | |
|---|---|
| G06F 18/214 | (2023.01) |
| B25J 9/16 | (2006.01) |
| G06N 3/045 | (2023.01) |
| G06N 3/08 | (2023.01) |
| G06N 20/00 | (2019.01) |

(52) U.S. Cl.
CPC ........ *G06F 18/2148* (2023.01); *B25J 9/1671* (2013.01); *G06N 3/045* (2023.01); *G06N 3/08* (2013.01); *G06N 20/00* (2019.01)

(58) Field of Classification Search
CPC .................................................... G06F 18/2148
USPC .................................. 382/159; 700/255, 245
See application file for complete search history.

(56) References Cited

U.S. PATENT DOCUMENTS

| | | |
|---|---|---|
| 10,792,810 B1 | 10/2020 | Beckman et al. |
| 10,800,040 B1 | 10/2020 | Beckman et al. |
| 10,926,408 B1 | 2/2021 | Vogelsong et al. |
| 11,429,762 B2 | 8/2022 | Mallya Kasaragod |
| 11,461,589 B1 | 10/2022 | Bai |
| 2019/0160678 A1 | 5/2019 | Zhang |
| 2020/0050206 A1* | 2/2020 | Deyle .................. G05D 1/0261 |
| 2020/0189103 A1* | 6/2020 | D'Ercoli ................ B25J 9/1666 |
| 2020/0311616 A1* | 10/2020 | Rajkumar .............. G06N 3/008 |

* cited by examiner

*Primary Examiner* — Kiet M Doan
(74) *Attorney, Agent, or Firm* — Gray Ice Higdon

(57) ABSTRACT

Mitigating the reality gap through training and utilization of at least one difference model. The difference model can be utilized to generate, for each of a plurality of instances of simulated state data generated by a robotic simulator, a corresponding instance of modified simulated state data. The difference model is trained so that a generated modified instance of simulated state data is closer to "real world data" than is a corresponding initial instance of simulated state data. Accordingly, the difference model can be utilized to mitigate the reality gap through modification of initially generated simulated state data, to make it more accurately reflect what would occur in a real environment. Moreover, the difference representation from the difference model can be used as input to the control policy to adapt the control learned from simulator to the real environment.

17 Claims, 7 Drawing Sheets

MITIGATING REALITY GAP THROUGH MODIFICATION OF SIMULATED STATE DATA OF ROBOTIC SIMULATOR

BACKGROUND

Various machine learning based approaches to robotic control have been proposed. Some of those approaches train a machine learning model (e.g., a deep neural network model) that can be utilized to generate one or more predictions that are utilized in control of a robot, and train the machine learning model using training data that is based only on data from real-world physical robots. However, these and/or other approaches can have one or more drawbacks. For example, generating training data based on data from real-world physical robots requires heavy usage of one or more physical robots in generating data for the training data. This can be time-consuming (e.g., actually navigating a large quantity of paths requires a large quantity of time), can consume a large amount of resources (e.g., power required to operate the robots), can cause wear and tear to the robots being utilized, and/or can require a great deal of human intervention.

In view of these and/or other considerations, use of robotic simulators has been proposed to generate simulated robot data that can be utilized in generating simulated training data that can be utilized in training of the machine learning models. However, there is often a meaningful "reality gap" that exists between real robots and real environments—and the simulated robots and/or simulated environments simulated by a robotic simulator. This can result in generation of simulated training data that do not accurately reflect what would occur in a real environment. This can affect performance of machine learning models trained on such simulated training data and/or can require a significant amount of real world training data to also be utilized in training to help mitigate the reality gap.

SUMMARY

Implementations disclosed herein relate to mitigating the reality gap through training and utilization of at least one difference model. In some of those implementations, a difference model is utilized to generate, for each of a plurality of instances of simulated state data generated by a robotic simulator, a corresponding instance of modified simulated state data. The difference model is a machine learning model (e.g., neural network model) trained so that a generated modified instance of simulated state data is closer to "real world data" than is a corresponding initial instance of simulated state data. An instance of simulated state data (and a corresponding generated modified instance of simulated state data) can define: simulated value(s) of one or more properties of a simulated robot (e.g., a corresponding position, velocity, and/or acceleration for each of one or more simulated joints of the simulated robot); and/or simulated value(s) of one or more properties of a simulated environment (e.g., a corresponding position, velocity, and/or acceleration for each of one or more simulated objects).

Accordingly, the difference model can be utilized to mitigate the reality gap through modification of initially generated simulated state data, to make it more accurately reflect what would occur in a real environment. For example, each instance of simulated state data, initially generated by the robotic simulator, can be processed using the difference model, and modified if the processing indicates modification is needed. This enables utilization of a robotic simulator, in combination with a trained difference model, in generating modified simulated state data that more accurately reflects real world data. For example, robotic simulators can generate a simulated data instance utilizing a simulated dynamic model component, simulated control model component, simulated contact model component, simulated friction model component, and/or other simulated component(s) of the robot simulator. Although the component(s) may be configured in an attempt to replicate corresponding real world properties, certain values of the component(s) can be incorrect and/or certain real world properties may not be modeled by the component(s) (e.g., joint backlash, gear inertia, robot inertia). Accordingly, simulated state data instances generated by a robotic simulator may not conform to the "real world". Through training and use of difference model(s) as described herein, the simulated state data instances can be modified to generate modified state data instances that more closely conform to the real world. Thus, the difference model, once trained, can be used to modify simulated state data instances to compensate for various properties that are un-modeled and/or incorrectly modeled by the robotic simulator. As also described in more detail herein, a trained difference model can additionally or alternatively be used to modify the robot control policy, through applying, to the robot control policy, difference embedding(s) generated based on processing instances of simulated state data using the trained difference model. This can also compensate for various properties that are un-modeled and/or incorrectly modeled by the robotic simulator.

As mentioned above, a trained difference model can be utilized, in combination with a robotic simulator, in generating modified simulated state data that more accurately reflects real world data. Such modified simulated state data can be used for robot task regression testing and/or prototyping. Additionally or alternatively, a robotic simulator can be used in combination with a trained difference model, in generating simulated training data that is based on modification of the simulated state data. Such simulated training data can be used for training a machine learning model. The machine learning model trained based on such simulated training data can be, for example, a control policy model used in controlling a real physical robot during performance of one or more robotic tasks, such as robotic navigation tasks, object manipulation tasks (e.g., grasping), and/or other robotic task(s). In various implementations, a lesser quantity of (or no) real training data can be utilized as a result of improved (e.g., more realistic) simulated training data that is generated by the robotic simulator, in combination with the difference model. Utilizing a lesser quantity of (or no) real training data can reduce resources that would otherwise be consumed by real-world physical robots in generating a greater quantity of real training data, can cause less wear and tear to real-world physical robots as a result of generating a lesser quantity of (or not) real training data, can lead to an increase in time-efficiency in generating training data (e.g., simulated episodes can be performed in less clock on the wall time than real-world episodes), and/or can achieve additional and/or alternative benefits. Moreover, use of the improved (e.g., more realistic) simulated training data in training one or more machine learning models leads to improved performance of task(s) (e.g., a higher success rate for the task(s)) by a real robot that utilizes the machine learning model(s) in performance of the task(s). In other words, bridging the reality gap according to various techniques disclosed herein can mitigate sim-to-real transfer problems and lead to improved performance of real robots that utilize machine learning model(s) trained according to techniques disclosed herein.

In modifying an instance of predicted simulated state data, the instance of simulated state data is processed using a difference model to generate a corresponding difference output. The corresponding difference output can be modified simulated state data that itself is the modification of the instance of simulated state data, or can instead indicate a modification that can be applied to the instance of simulated state data to generate the modified simulated state data. In various implementations, a single difference model is trained to process simulated state data, and to generate difference output that is utilized to modify the entire state of a robotic simulator (e.g., including robotic states and environmental states).

In some other implementations, multiple difference models are trained, with each being trained to process simulated state data, and to generate difference output that is utilized to modify only a subset of simulated state data. For example, a first difference model can be trained to generate first difference output that indicates modifications of one or more simulated robotic states (e.g., used to modify predicted robot motion of a simulated robot), a second difference model can be trained to generate second difference output that indicates modifications of one or more environmental states (e.g., used to modify predicted relative velocity of contacted environmental object(s)), etc. Accordingly, in such other implementations, each of the difference models can be trained to generate modifications of a subset of simulated robotic states, and each of the subsets can optionally be associated with a component of the robotic simulator (e.g., a contact model component, a robot motion component, etc.).

A difference model is itself a machine learning model, such as a neural network model. In various implementations, the difference model is a recurrent neural network (RNN) model that includes one or more memory layers. The memory layer(s) can each include one or more memory units, such as long short-term (LSTM) memory units, gated recurrent unit(s), and/or other memory units. Such memory layers enable selective retention of data from processing of previously processed instances of simulated state data. Accordingly, in implementations where the difference model is an RNN model, a sequence of simulated state data instances will be processed using the RNN model, and the difference output generated using the RNN model at each iteration will be dependent on earlier processed instances of the simulated state data. Thus, previously observed simulated state data instances will influence the modified simulated state data for later observed simulated state data instances. This results in a trained difference model that does not simply map a given instance of simulated state data to a single corresponding instance of modified simulated state data. Rather, the modified simulated state data determined for the given instance of simulated state data can vary in dependence on recently processed instances of simulated state data. In these and other manners, more accurate modified instances of simulated state data are generated, at least as compared to those generated using difference models that do not take into account prior instances of simulated state data. Also, as described below and elsewhere herein, the difference model effectively adapts to any one of various disparate environments through utilization of the state history of the environment.

Moreover, the difference model can be trained and/or effectively utilized over a plurality of disparate simulated robots and/or simulated environments. In other words, even though robot and/or environmental parameters in a first simulation can vary from those in a second simulation, simulated state data generated in both the first and second simulations can be effectively modified to effectively mitigate the reality gap. This can be due to the prior instance(s) of simulated data being taken into account (thus providing modifications that are influenced by the prior instance(s)), instead of the difference model simply mapping a given instance of simulated state data to a single corresponding instance of simulated state data. Thus, even though the same instance of simulated state data may be generated in both the first and second simulations, different modifications of the instance of simulated state data can be generated based on prior instances varying in the respective simulations.

In training a difference model, implementations generate and store real episode data instances. Each real episode data instance can include a sequence of actions generated to control a real robot during a real episode of performing a corresponding task with the real robot. Each real episode data instance can further include one or more ground truth state data instances. Each ground truth state data instance defines, for a corresponding point of the real episode of performing the task: a corresponding measured value for each of one or more properties of the real robot (e.g., position(s) of joint actuator(s), pose(s) of the real robot, and/or other value(s) for one or more other properties); and/or a corresponding state for each of one or more real environmental objects interacted with by the real robot (e.g., pose(s) of the object(s) and/or velocities of the object(s)). Measured values for the real robot can be based on, for example, output from local sensor(s) of the robot, data from a motion capture system, and/or human measurements. States for the environmental objects can be based on, for example, detections from the real robot, human measurements, and/or data from a motion capture system.

The real episode data instances are then utilized in performing simulated episodes of using a robotic simulator that simulates a simulated robot and a simulated environment. During a simulated episode, a sequence of actions (of a real episode data instance) are applied to the simulated robot to control the simulated robot during the simulated episode. Simulated state data instances are generated during the simulated episode, with each of the simulated data instances being for after a corresponding one of the actions of the sequence. Each of the simulated state data instances can be processed using the difference model, to generate a corresponding modified simulated state data instance. The corresponding modified simulated state data instances can each be a corresponding output from the difference model, or can be generated based on a corresponding modification that is corresponding output from the difference model. The difference model is updated based on comparison of one or more of the ground truth state data instances to the corresponding ones of the modified simulated state data instances. For example, a loss can be generated based on comparison of a first ground truth state data instance to a first modified simulated state data instance, comparison of a second ground truth data instance to a second modified simulated state data instance, etc. The loss can then be back-propagated to update parameters of the difference model. Through multiple iterations, the performance of the difference model is iteratively improved, in view of losses based on corresponding simulated and ground truth state data instances. Training of the difference model can halt upon satisfaction of one or more conditions, such as convergence of the difference model, performance of a threshold quantity of training epochs, processing of all available real episode data instances, and/or other conditions.

As mentioned above, a trained difference model can be utilized in training one or more machine learning models. In some of those implementations, the trained difference model is utilized to generate modified instances of simulated state data based on processing of the instances of simulated state data—and the modified instances of simulated state data are utilized in training the machine learning model(s) (in lieu of the unmodified instances). For example, the machine learning model can be a policy model that processes robot and/or environmental states and generates corresponding robotic action predictions. The modified instances of simulated state data can be utilized, in training the policy model, as the robot and/or environmental states, and utilized in determining a reward (based on a reward function) utilized in updating the policy model during training.

In some other implementations, the unmodified instances of simulated state data are utilized in training the machine learning models, along with difference embeddings generated based on processing the instances of simulated state data. Each difference embedding is an embedding, from the difference model, after processing of corresponding instances of simulated state data. The difference embedding can be a final embedding of a last layer of the difference model, or an embedding from another layer of the difference model. For example, the machine learning model can be a policy model that is utilized to process robot and/or environmental states, along with a difference embedding, and to generate corresponding robotic action predictions based on the processing. Accordingly, unmodified simulated state data is processed utilizing the policy model (along with the embedding from the difference model), instead of processing modified simulated state data utilizing the policy model. However, a difference embedding from the difference model is processed along with the unmodified simulated state data, thereby training the policy model to predict robotic actions as a function of the simulated state data and the embedding from the difference model (e.g., effectively training the policy model to adapt processing of the simulated state data as a function of the difference embedding). The difference model can then continue to be utilized, in combination with the policy model, in use on real robots and can enable effective adaptation of the policy model to disparate real robots, as the embeddings generated utilizing the difference model will reflect differences amongst the disparate real robots.

As used herein, the "reality gap" is a difference that exists between real robots and real environments—and simulated robots and simulated environments simulated by a robotic simulator. Implementations disclosed herein present various techniques for mitigating the reality gap for a robotic simulator and more particularly, for mitigating the reality gap through training and utilization of a difference model, for modifying simulated state data instances to make them more akin to real world data instances.

The above description is provided as an overview of some implementations of the present disclosure. Further description of those implementations, and other implementations, are described in more detail below.

In some implementations, a method is provided that includes accessing a real episode data instance stored in one or more computer-readable media. The real episode data instance includes: a sequence of actions generated to control a real robot during a real episode of performing a task with the real robot; and one or more ground truth state data instances for the real episode of performing the task. Each of the ground truth state data instances defines, for a corresponding point of the real episode of performing the task: a corresponding measured value for each of one or more properties of the real robot; and/or a corresponding state for each of one or more real environmental objects interacted with by the real robot. The method further includes performing a simulated episode using a robotic simulator with a simulated robot and a simulated environment. Performing the simulated episode includes applying the sequence of actions to the simulated robot in the simulated environment to generate a plurality of simulated state data instances for the simulated episode. Each of the simulated state data instances for the simulated episode defines, for a corresponding point of the simulated episode: a corresponding simulated value for each of the one or more properties of the simulated robot, and/or a corresponding simulated state for each of one or more simulated environmental objects interacted with by the simulated robot. The method further includes generating, for each of a plurality of the simulated state data instances and utilizing a difference model, a corresponding modified simulated state data instance that is a modification of a corresponding one of the plurality of simulated state data instances. The method further includes updating the difference model based on comparison of one or more of the ground truth state data instances to corresponding ones of the modified simulated state data instances. The method further includes using the updated difference model in generating additional modified simulated state data instances that are modifications of additional simulated state data instances generated using the robotic simulator.

These and other implementations disclosed herein can include one or more of the following features.

In some implementations, the difference model is a machine learning model. In some of those implementations, wherein generating the simulated state data instances includes: processing each of the simulated state data instances utilizing the difference model to generate the modified simulated state data instances; or processing each of the simulated state data instances utilizing the difference model to generate corresponding modifications, and applying the corresponding modifications to the corresponding simulated state data instances to generate the modified simulated state data instances. The difference model can be a recurrent neural network (RNN) model that includes one or more memory layers, and processing the predicted simulated state values utilizing the difference model can include sequentially processing the predicted simulated state values utilizing the RNN model. The one or more memory layers of the RNN model can include at least one memory layer that includes one or more memory units, such as long short-term (LSTM) memory units.

In some implementations, each of the ground truth state data instances defines, for a corresponding point of the real episode of performing the task, the corresponding measured value for each of the one or more properties of the real robot, and the one or more properties include position properties for one or more actuators of the real robot. In some of those implementations, each of the ground truth state data instances further defines, for the corresponding point of the real episode of performing the task, the corresponding state for each of the one or more real environmental objects interacted with by the real robot, and the corresponding state is a pose.

In some implementations, each of the ground truth state data instances defines, for a corresponding point of the real episode of performing the task, only the corresponding measured value for each of the one or more properties of the real robot, and each of the simulated state data instances for the simulated episode defines, for a corresponding point of the simulated episode, only the corresponding simulated value of the one or more properties of the simulated robot.

In some implementations, each of the ground truth state data instances defines, for the corresponding point of the real episode of performing the task, only the corresponding state for each of the one or more real environmental objects, and each of the simulated state data instances for the simulated episode defines, for a corresponding point of the simulated episode, only the corresponding simulated state for each of the one or more simulated environmental objects.

In some implementations, each of the ground truth state data instances defines, for the corresponding point of the real episode of performing the task, the corresponding state for each of the one or more real environmental objects interacted with by the real robot, and wherein the corresponding state is a pose.

In some implementations, using the modified difference model in generating additional modified simulated state data instances that are modifications of additional simulated state data instances generated using the robotic simulator includes: accessing an additional real episode data instance that includes: an additional sequence of additional actions generated to control the real robot, or an additional real robot, during an additional real episode of performing an additional real robot task, and one or more additional ground truth state data instances for the additional real episode of performing the additional task; performing an additional simulated episode using the robotic simulator, where performing the additional simulated episode includes: applying the additional sequence of additional actions to the simulated robot in the simulated environment, or an additional simulated environment, to generate a plurality of predicted additional simulated state data instances for the additional simulated episode; generating, for each of a plurality of the additional simulated state data instances and utilizing the updated difference model, a corresponding modified additional simulated state data instances that is a modification of a corresponding one of the plurality of additional simulated state data instances; further updating the difference model based at least in part on comparison of one or more of the additional ground truth state data instances to corresponding ones of the modified additional simulated state data; and using the further updated difference model in generating further additional modified simulated state values that are further modifications of further additional simulated state data instances generated using the robotic simulator.

In some implementations, the real episode data instance further includes environmental data that defines one or more real environmental parameters for the real environment in which the real episode of locomotion is performed. In some of those implementations, wherein performing the simulated episode using the robotic simulator further includes configuring the simulated environment based on the environmental data. The one or more real environmental parameters for the real environment, defined by the environmental data, can include one or more initial states for the environmental objects, and configuring the simulated environment based on the environmental data can include configuring the simulated environment based on the one or more initial states.

In some implementations, the method further includes selecting, from a superset of simulated environmental parameters for a particular simulated environmental property, a particular simulated environmental parameter for the particular simulated environmental property. In some of those implementations, performing the simulated episode using the robotic simulator further includes configuring the simulated environment with the particular simulated environmental parameter.

In some implementations, the method further includes: performing one or more further iterations of updating the difference model; determining that one or more criteria are satisfied after performing the one or more further iterations; and responsive to determining that the one or more criteria are satisfied: generating simulated training data for training of one or more machine learning models for use in control of at least one additional real robot. Generating the simulated training data can include: generating initial simulated training data using the robotic simulator; and generating the simulated training data by modifying the generated initial simulated training data, using the difference model as most recently updated by performing the one or more further iterations. In some versions of those implementations, the method further includes transmitting the simulated training data for training of the machine learning model based on the simulated training data. In some additional or alternative versions, the method further includes training the machine learning model based on the simulated training data, and transmitting the trained machine learning model for use in control of the at least one additional robot.

In some implementations, a method is provided that includes generating initial instances of simulated state data of a robotic simulator based on actions predicted using a policy model being trained. The method further includes generating modified instances of simulated state data, that are each a modification of a corresponding one of the instances of simulated state data. Generating the modified instances of simulated state data includes sequentially processing the instances of simulated state data using a trained difference model, such as a trained difference model that is a trained recurrent neural network (RNN) model. The method further includes generating the predicted actions by processing the modified instances of state data using the policy model, and updating the policy model based on a reward function.

In some implementations, a method is provided that includes generating a sequence of instances of observed state data. Each of the instances of the observed state data of the sequence each define: a corresponding measured value for each of one or more properties of a real or simulated robot, and/or a corresponding state for each of one or more real or simulated environmental object. The method further includes sequentially processing the sequence of instances of observed state data using a trained difference model, such as a trained recurrent neural network (RNN) model. The method further includes: extracting a difference representation from the trained difference model after sequentially processing the sequence of observed state values; and applying the difference representation to a trained policy model, along with additional observed instances of observed state data, in generating predicted actions for control of the real robot or the simulated robot.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Training of machine learning models that are robust and accurate, and that can be utilized for control of real-world physical robots, is often limited by the scalability of using real-world physical robots to generate a sufficient quantity of training data and/or to generate training data that is sufficiently diverse. Implementations described herein present techniques for mitigating the reality gap between a robotic simulator, and real-world physical robot(s) and/or a real-world environment through utilization of difference model(s). In some implementations, the difference model(s) are utilized to generate, for each of a plurality of instances of simulated state data generated by a robotic simulator, a corresponding instance of modified simulated state data. The modified simulated state data can be used in training of one or more machine learning models that can be used in the control of real-world physical robots. The modified simulated state data can be improved (e.g., more realistic) relative to the unmodified initial simulated state data. This can enable training of a robust and/or accurate machine learning model, while reducing a quantity of real-world training data that is also utilized in training the machine learning model— or even eliminating the need for use of real-world training data in training of the machine learning model. In some implementations, unmodified instances of simulated state data are utilized in training a machine learning model, along with difference embeddings generated based on processing the instances of simulated state data utilizing trained difference model(s). Accordingly, unmodified simulated state data is processed utilizing the machine learning model, instead of processing modified simulated state data utilizing the machine learning model. However, a difference embedding from the difference model is processed along with the unmodified simulated state data, thereby training the policy model to predict robotic actions as a function of the simulated state data and the embedding from the difference model.

Figure 1:
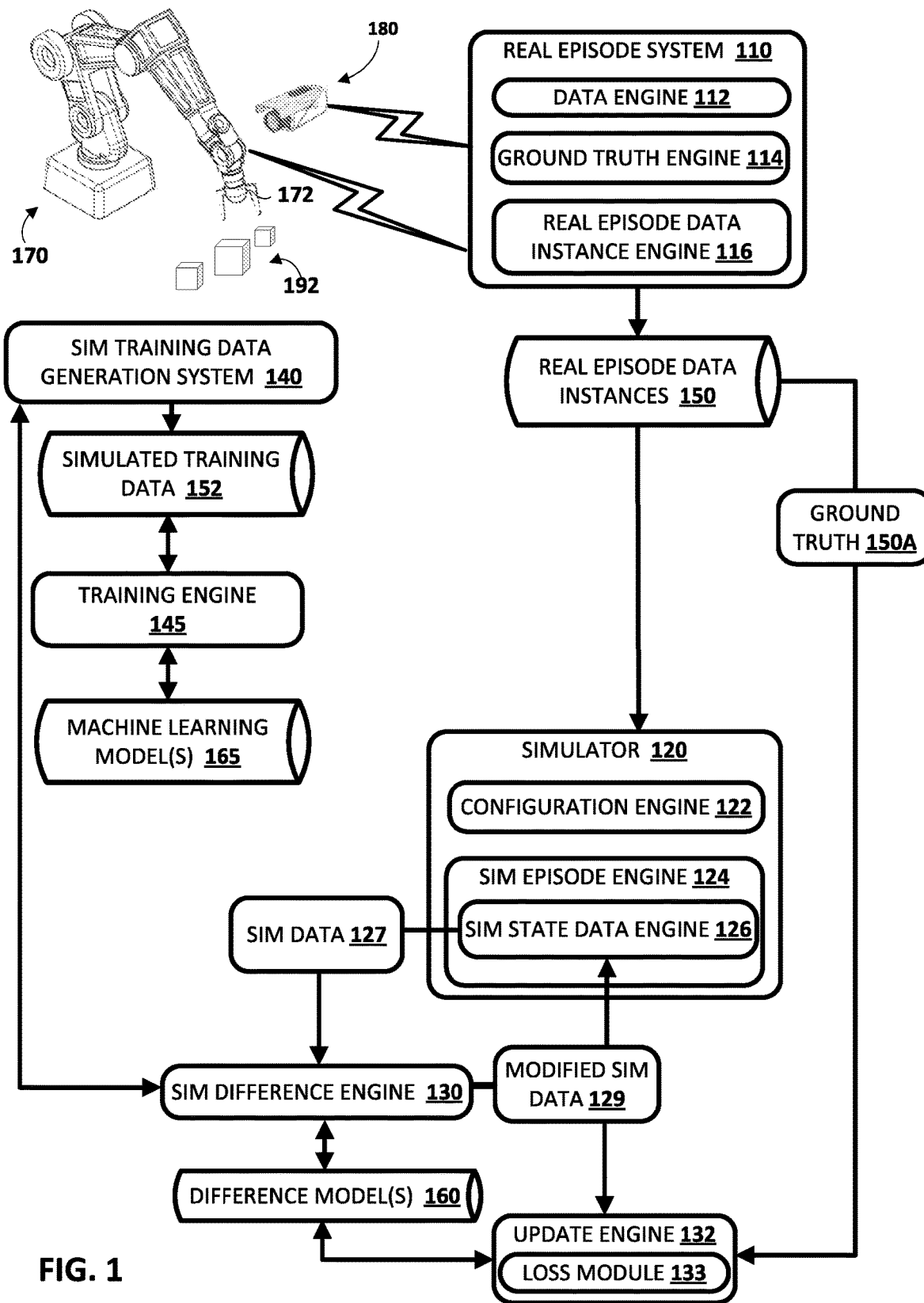
FIG. 1 illustrates an example environment in which implementations described herein can be implemented.

Turning now to the figures, FIG. 1 illustrates an example environment in which implementations described herein can be implemented. FIG. 1 includes an example robot 170, a motion capture system 180, a real episode system 110, a robotic simulator 120, a simulated (sim) difference engine 130, an update engine 132, a simulator (sim) training data generation system 140, and a training engine 145. Also included are one or more difference models 160, real episode data instances 150, simulated training data 152, and one or more machine learning models 165.

Robot 170 is a "robot arm" having multiple degrees of freedom to enable traversal of grasping end effector 172 along any of a plurality of potential paths to position the grasping end effector 172 in desired locations. Robot 170 further controls two opposed "claws" of grasping end effector 172 to actuate the claws between at least an open position and a closed position (and/or optionally a plurality of "partially closed" positions). Environmental objects 192 are also illustrated in FIG. 1 as various sized blocks, and can be interacted with (e.g., pushed, pulled, grasped) by the robot 170 during an episode. Other environmental object(s) can be included in addition to and/or in lieu of those illustrated in the example of FIG. 1. For example, additional and/or alternative objects 192 can be included such as a spatula, a stapler, a pencil, plates, and/or any other objects. Also, although a particular robot 170 is illustrated in FIG. 1, additional and/or alternative robots may be utilized, including additional robot arms that are similar to robot 170, robots having other robot arm forms, robots having a humanoid form, robots having an animal form, robots that move via one or more wheels, an unmanned aerial vehicle ("UAV"), and so forth. Also, although a particular grasping end effector 172 is illustrated in FIG. 1, additional and/or alternative end effectors may be utilized (or even no end effectors), such as alternative impactive grasping end effectors (e.g., those with grasping "plates", those with more or fewer "digits"/"claws"), "ingressive" grasping end effectors, "astrictive" grasping end effectors, or "contiguity" grasping end effectors, or non-grasping end effectors.

Robot 170 and/or other robots can be utilized to perform real episodes of one or more robotic tasks, and data associated with the episodes can be utilized by the real episode system 110 to generate real episode data instances 150. The real episode data instances 150 can be stored by the real episode system 110 in one or more computer-readable media (e.g., one or more databases). In some implementations, all or aspects of real episode system 110 can be implemented on robot 170 (e.g., via one or more processors of robot 170). In some implementations, all or aspects of real episode system 110 can be implemented on one or more computing devices that are separate from, but in network communication with, robot 170.

During each real episode, the robot 170 (or another robot) is controlled to cause the robot to perform a corresponding robotic task, such as a movement task, a manipulation task, a navigation task (e.g., for robots that have wheel(s), leg(s), and/or other means of locomotion). Different robotic tasks can be performed in different real episodes. The control of the robot 170 during an episode can be random, pseudo-random, and/or dictated by one or more control policies. As one non-limiting example, the robotic task can be a grasping task where the robot 170 attempts to grasp one (e.g., any one) of the objects 192 utilizing the end effector 172. For instance, at the start of each episode, the robot 170 can be in a corresponding starting pose (e.g., a pseudo-randomly determined pose). At each time step of the episode, a robot action can be determined (e.g., randomly or pseudo-randomly determined) and implemented that causes the end effector 172 to move (e.g., translationally and/or rotationally). At one or more final time steps of the episode, the end effector 172 can be actuated to attempt a grasp. For instance, the two "grasping members" of the end effector 172 can be actuated to cause them to "close" (e.g., move closer together) until they are touching, are applying at least a threshold level of force, and or other criterion/criteria are satisfied.

The data engine 112 of the real episode system 110 stores, for each real episode, the sequence of actions generated to control the robot 170 during the real episode. The sequence of actions can be generated by the robot 170, and provided to the real episode system 110 by the robot 170. In some implementations, the sequence of actions can be low-level actions, such as control command(s) issued to actuators of the robot 170 during the real episode. For example, the robot 170 can include a controller that translates higher level commands into more specific control commands to provide to one or more actuators of the robot 170 during a real episode. The control commands can include one or more velocity control command(s) issued to actuator(s) of the robot 170 at a corresponding instance, to control movement of the robot 170 during the real episode. For example, in controlling movement of the robot 170, velocity control commands can be issued to each of the actuators that control movement of the end effector 172. Using the velocity control commands or other lower-level control commands, instead of higher-level control commands, enables the velocity control commands to be utilized in simulation to remove any reality gap impacts that may be present in simulated controllers that would translate the higher level control commands to the velocity control instances.

The data engine 112 also optionally stores, for each real episode, environmental data for the real episode. The environmental data can define the beginning state of one or more environmental objects at the beginning of the real episode and/or one or more other properties for one or more environmental objects. For example, the environmental data can define: a beginning pose (e.g., full 6D pose) of each of the objects 192; size, shape, weight, and/or material for each of the objects 192; topological and/or friction properties for a surface (unillustrated) on which the objects 192 rest; and/or other environmental properties. The beginning state of environmental object(s) can be determined, for example, utilizing vision data from the motion capture system 180, vision data from a vision component (unillustrated) of the robot 170, and/or using human measurements. For instance, one or more techniques utilized in determining ground truth state data instances for environmental objects, can be utilized in determining the beginning state of the environmental objects.

The ground truth engine 114 of the real episode data system generates one or more ground truth state data instances for each real episode. The ground truth state data instance(s) for a real episode can be generated by the ground truth engine 114 based on data from the robot 170, data from motion capture system 180, and/or data from human measurements. Generated ground truth state data instance(s) are also included in a real episode data instance. Each of the ground truth state data instances defines, for a corresponding point of the real episode, one or both of: a corresponding measured value for each of one or more properties of the real robot, and a corresponding state for each of one or more real environmental objects interacted with by the real robot during the real episode. For example, a ground truth data instance can define a pose and/or velocity of an end effector of the robot and/or a position and/or velocity for each of a plurality of actuators that control the pose of the end effector. Also, for example, a ground truth data instance can additionally or alternatively define a pose and/or velocity for one or more environmental objects, and/or a contact force being applied, by the robot, to an environmental object. Each of the ground truth values is for a corresponding point of the real episode and can be correlated to that point through assignment to a corresponding action and/or to a corresponding timestamp of the real episode. It is noted that, in various implementations, the ground truth engine 114 can generate a first quantity of ground truth state data instances for a real episode, where the first quantity is less than a second quantity of actions (stored by the data engine 112) for the real episode. For example, there can be a sequence of 500 velocity control instances (actions) for a real episode, and all 500 velocity control instances can be stored. However, there can be less than 500 ground truth state data instances generated and stored. For instance, there can be only 1, 5, 10, or other quantity of ground truth state data instances generated and stored.

In some implementations, the ground truth engine 114 generates all or part of a ground truth state data instance based on data provided by the robot 170. For example, as the robot 170 moves during an episode, sensor data is generated by sensors of the robot that indicate movement of the robot during the episode. For example, position sensors associated with each of the actuators of the robot 170 can provide position readings at each of a plurality of points during an episode, and can be utilized by the ground truth engine to generate ground truth state data instances that define measure values for properties of the robot 170. For instance, the position readings at a given instance can be utilized to determine a pose of the end effector 172 (in joint space and/or in task space), to determine a velocity of the end effector 172 (in joint space and/or in task space), and/or to determine an acceleration of the end effector 172 (in joint space and/or in tsk space). For example, the pose of the end effector 172 at a given point can be defined in joint space as positions for each of the actuators of the robot 170 that control the pose of the end effector 172.

As another example of generating all or part of a ground truth state data instance based on data provided by a robot, in some implementations the robot can be mobile and can include a localization module that utilizes data from one or more sensors of the robot to estimate a pose of the robot at each of a plurality of points during a real episode of locomotion, and a given pose utilized as all or part of a given ground truth state data instance. For example, the localization module can estimate a current pose of the robot based on odometers, vision data from vision component(s) (e.g., a camera), an inertial measurement unit (IMU), and/or other sensor data. As yet another example, vision data from a vision component of the robot can be utilized to determine a pose and/or other state (e.g., velocity, acceleration) of an environmental object at a given point, and such state utilized as all or part of a given ground truth state data instance.

In some implementations, the ground truth engine 114 generates all or part of a ground truth state data instance based on data provided by the motion capture system 180. Motion capture system 180 is external to the robot 170 and includes a vision component (e.g., high-speed camera) to capture vision data (e.g., images). The vision component of the motion capture system 180 has a field of view of at least a portion of the real environment of the robot 170. The vision component can be attached at a fixed location in the environment, but can optionally be adjustable. For example, the pose (e.g., pan and/or tilt) of the motion capture system 180 can be adjusted and/or a field of view, capture rate, and/or other properties of the motion capture system 180 can be adjusted. The vision component of the motion capture system 180 can be, for example, a monographic camera (e.g., generating 2D RGB images), a stereographic camera (e.g., generating 2.5D RGB images), a laser scanner (e.g., generating 2.5D "point clouds"), and/or a high-speed camera (e.g., generating 2D RGB images of reflective markers) and can be operatively connected to one or more systems (e.g., the real episode system 110) disclosed herein.

Vision data can be captured by one or more vision components of motion capture system 180 during a real episode. The vision data can be processed by the motion capture system 180, and/or the real episode data system 110 to generate one or more values for utilization in ground truth data instance(s) for the real episode. The value(s) generated based on such data can include pose(s) of the real robot 170 (e.g., including position and orientation components), one or more velocities of the real robot 170, pose(s) of the environmental object(s) 192, one or more velocities of the environmental object(s) 192, and/or other values that are each a measured property of the robot 170 and/or environmental object(s) 192 at a corresponding point in time. Optionally, one or more markers may be placed along the environment (e.g., a grid overlaid on the surface), on the robot 170 (e.g., passive or active markers), and/or on the environmental objects 192 and utilized in generating ground truth values based on the vision data captured by the vision component(s) of motion capture system 180. For example, a grid overlaid on the surface can be utilized in generating ground truth pose value(s) based on portion(s) of the grid being captured in corresponding vision data. Optionally, a clock of the motion capture system 180 can be synced with a clock of the real robot 170 to enable assignment of generated ground truth value(s) to corresponding points of a real episode of locomotion. For example, a given ground truth pose can be assigned to a corresponding time and/or action of a real episode data instance based on the given ground truth pose being generated based on vision data having a timestamp that matches the corresponding time and/or a timestamp of the corresponding action.

Additionally and/or alternatively, human measurements may be taken and may be provided to the real episode system 110 and utilized in generating ground truth state data instances. For example, during a real episode, a tape measure and compass can be used to determine a pose of the robot 170 and/or the objects 192 relative to a reference frame in the real environment.

The real episode data instance engine 116 generates a real episode data instance based on a continuous sequence of at least a portion of the actions from the robot data engine 112 for a corresponding real episode, and based on ground truth state data instance(s), from the ground truth engine 114, that correspond to those actions. The real episode data instance engine 116 can correlate actions and ground truth state data instances based on, for example, corresponding timestamps of the actions and the ground truth state data instances. For example, the real navigation data instance engine 116 can correlate a ground truth state data instance to an action (or a corresponding time) based on a timestamp for the ground truth state data instance being most proximal to a timestamp for the action (or the corresponding time).

For a given real episode, the real episode data instance engine 116 can generate one or multiple real episode data instances. For example, a given real episode can have a 10 second duration and a first real episode data instance can be generated that includes actions for the entire duration, and corresponding ground truth state data instance(s). Further, a second real navigation data instance can be generated that includes actions for only a first portion of the duration (e.g., from 2.5 seconds in, until 8.0 seconds in), and corresponding ground truth state data instance(s). Yet further, a third real navigation data instance can be generated that includes actions for only a second portion of the duration (e.g., from 5.0 seconds in, until the end), and corresponding ground truth state data instance(s).

The simulator 120 is a robotic simulator implemented by one or more computer systems and is used to simulate an environment that includes corresponding environmental object(s), to simulate a robot operating in the simulated environment (e.g., to simulate robot 170), to simulate responses of the robot in response to virtual implementation of various simulated robotic actions, and to simulate interactions between the simulated robot and the simulated environmental objects in response to the simulated robotic actions. Various simulators can be utilized, such as physics engines that simulates collision detection, soft and rigid body dynamics, etc. One non-limiting example of such a simulator is the BULLET physics engine.

The simulator 120 includes a configuration engine 122. The configuration engine 122 can be utilized, prior to performance of a simulated episode that is based on a real episode data instance, to adapt a simulated environment, of the simulator 120, in accordance with environmental data included in the real episode data instance. For example, the environmental data can define environmental objects and the beginning state of the environmental objects. The configuration engine 122, for the simulated episode, can adapt the simulated environment to include simulated objects that conform to the environmental objects, and to include them in the beginning state.

The simulated episode engine 124 of the simulator 120 is utilized to perform simulated episodes that are each based on a corresponding one of the real episode data instances 150 generated by the real episode system 110. In performing each such simulated episode, the simulated episode engine 124 retrieves one of the real episode data instances 150 from the computer readable medium/media in which it is stored. If the retrieved real navigation data instance includes environmental data, the configuration engine 122 can configure a simulated environment based on such environmental data as described above. Otherwise, a default beginning environmental configuration can be utilized, a randomly selected beginning environmental configuration can be utilized, or an environmental configuration can be selected based on a learned distribution.

The simulated episode engine 124 causes a simulated episode to be performed by causing the actions of the real episode data instance to be implemented by the simulated robot in the simulated environment. The simulated state data engine 126 of the simulated episode engine 124 determines simulated state data instances 127 for the simulated episode, where each of the simulated state data instances 127 defines all or aspects of the predicted state of the simulator, following implementation of a corresponding action. For example, a given predicted simulated sate data instance can define: a corresponding simulated value for each of one or more properties of the simulated robot, and/or a corresponding simulated state for each of one or more simulated environmental objects interacted with by the simulated robot.

As described in more detail below, the sim difference engine 130 can directly utilize one or more difference models 160 to process simulated state data instances and to generate, as output, corresponding modified simulated state data instances. When the difference model(s) 160 are being trained, an update engine 132 can train the difference model(s) 160 based on comparison of the generated modified simulated state data instances (generated as output from sim difference engine 130 utilizing difference model(s) 160) to corresponding ground truth state data instances. When the difference model(s) 160 are considered to be trained (e.g., condition(s) satisfied), simulated training data 152 can be generated using the sim difference engine 130 and the trained difference model(s) 160, and the simulated training data 152 utilized in training one or more machine learning model(s) 160. For example, new simulated state data instances from the simulator 120 can be processed, by the sim difference engine 130 using the trained difference model(s) 160, to generate, as output, corresponding new modified state data instances. The new modified state data instances can be utilized in updating the simulator 120 and can be utilized as the simulated training data 152 that is used in training the machine learning model(s) 160.

Each of the simulated stated data instances 127 is provided to the sim difference engine 130. The sim difference engine 130 processes the simulated state data instance utilizing one or more difference models 160, to generate a modified simulated state data instance 129. For example, the sim difference engine 130 can process a given simulated state data instance using a difference model 160 to generate a corresponding difference output. The corresponding difference output can be modified simulated state data that itself is the modified simulated state data instance 129, or can instead indicate a modification that is applied, by the sim difference engine 130, to the instance of simulated state data to generate the modified simulated state data instance 129. In various implementations, the difference model(s) 160 are each a recurrent neural network (RNN) model that includes one or more memory layers. Such memory layers enable selective retention of data from processing of previously processed instances of simulated state data. Accordingly, in implementations where a difference model is an RNN model, a sequence of simulated state data instances will be processed using the RNN model, and the difference output generated using the RNN model at each iteration will be dependent on earlier processed instances of the simulated state data. Thus, previously observed simulated state data instances will influence the modified simulated state data for later observed simulated state data instances. This results in a trained difference model where modified simulated state data determined for a given instance of simulated state data can vary in dependence on recently processed instances of simulated state data.

The generated modified simulated state data instance 129 is provided to the sim state data engine 126 and replaces the original simulated state data instance during the simulated episode. Accordingly, at each iteration during a simulated episode, a corresponding action can be applied to the simulated robot to cause the simulated state data engine 126 to generate a corresponding simulated state data instance 127 (influenced by the action). However, that simulated state data instance 127 is not utilized to update the state of the simulator 120. Rather, a corresponding generated modified simulated state data instance 129 is utilized to update the state.

The update engine 132 updates the difference model(s) 160 based on modified simulated data instance(s) 129 generated during a simulated episode that is based on actions of a real episode data instance, and corresponding ground truth data instances of the real episode data instance. For example, the loss module 133 can generate a loss based on comparison of: modified simulated state data instance(s) 129 for the simulated episode; and corresponding ground truth state data instance(s) 150A for the corresponding real episode. The update engine 132 can utilize the loss to update the difference model(s) 160 (e.g., the loss can be backpropagated). For instance, a final modified simulated state data instance 129 for the simulated episode can define a final simulated robot pose and a final simulated environmental object pose, and the loss module 133 can generate a loss based on differences between those simulated poses and a final real robot pose and a final real environmental object pose defined by a corresponding ground truth data instance 159A. Although update engine 132 is illustrated separate from sim difference engine 130 in FIG. 1, in various implementations the update engine 132 can be incorporated as part of the sim difference engine 130. Also, although the preceding example is described with respect to a loss that is based on only final simulated and ground truth state data instances, the loss can additionally or alternatively be based on comparison of additional simulated data instances and ground truth data instances. For instance, the loss can be a function of comparison of each of a plurality of simulated state data instances generated during the simulated episode, to corresponding ground truth state data instances. Also, in some implementations, multiple losses can be generated during a simulated episode, and each utilized to update the difference model(s) 160. Additional description of these and other techniques is described herein (e.g., with respect to FIG. 4).

Figure 2A:
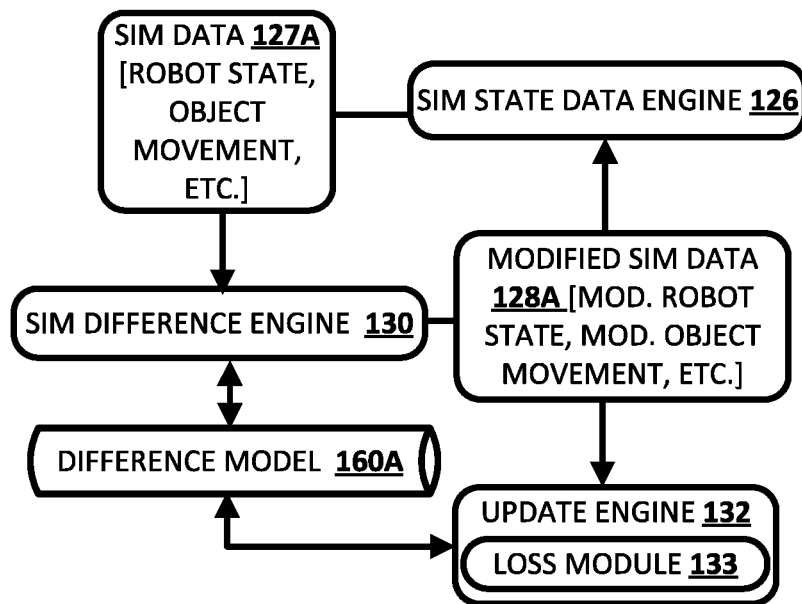
FIG. 2A illustrates an example of utilizing a single difference model in generating modified simulated state data instances.

With reference to FIG. 2A, in some implementations the difference model(s) 160 consist of a single difference model 160A. In some of those implementations, the simulated state data instances 127 can be a simulated state data instances 127A that each define a corresponding simulated robot state, simulated object movements (if any), and/or other simulated state values. The sim difference engine 130 can process the simulated state data instances 127A to generate modified simulated state data instances 128A that also each define a corresponding modified simulated robot state, modified simulated object movements (if any), and/or other modified simulated state values.

Figure 2B:
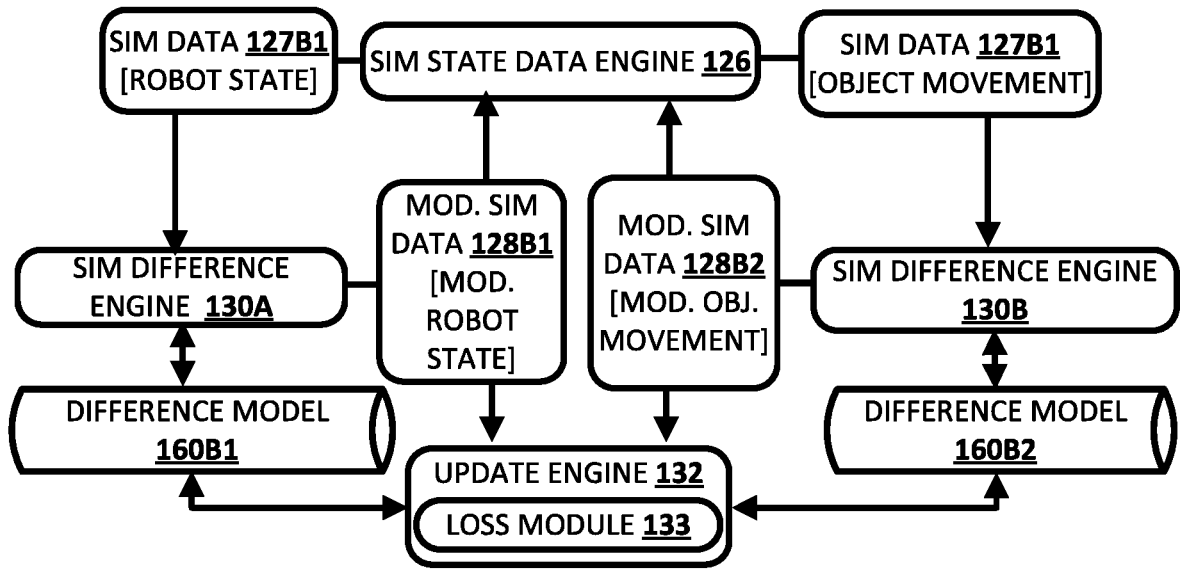
FIG. 2B illustrates an example of utilizing multiple difference models in generating modified simulated state data instances.

With reference to FIG. 2B, in some other implementations, the difference model(s) 160 include multiple difference models, such as difference model 160B1 and difference model 160B2. In some of those implementations, the simulated state data instances 127 can include multiple subsets of simulated state data, each being processed utilizing a corresponding difference model to generate corresponding modified simulated state data. For example, simulated state data instances 127 can be divided into simulated state data instance subsets, such as subsets 127B1 that each include only simulated robot states (e.g., based on output from a control model of the simulator 120) and subsets 127B2 that each include only simulated object movements (e.g., direction and velocity of movement of simulated object(s), optionally based on output from a contact model of the simulator 120). A first instance 130A of the sim difference engine 130 can process the subsets 127B1 utilizing the difference model 160B1 to generate subsets 128B1 of modified simulated state data instances that include only modified simulated robot states. A second instance 130B of the sim difference engine 130 can process the subsets 127B2 utilizing the difference model 160B2 to generate subsets 128B2 of modified simulated state data instances that include only simulated object movements.

Further, update engine 132 can update the difference model 160B1 based on comparisons of one or more of the subsets 128B1 to corresponding ground truth data instances subsets. Update engine 132 can separately update the difference model 160B2 based on comparisons of one or more of the subsets 128B2 to corresponding ground truth data instances subsets. For example, the difference model 160B1 can be updated based on comparison of modified simulated robot pose(s) to corresponding ground truth robot pose(s), whereas difference model 160B2 can be updated based on comparison of modified simulated environmental object state(s) to corresponding ground truth environmental object state(s). Accordingly, in various implementations multiple difference models can be provided, with each being trained to process a different subset of simulated state data and generate a corresponding subset of modified simulated state data. In some of those various implementations, each of the difference models can be trained to process simulated state data from a corresponding component of the robot simulator 120, such as a simulated contact model component, a simulated control model component, and/or other simulated component.

Training of the difference model(s) 160 based on performing simulated episodes, that are based on real episode data instances, can continue for a large quantity of iterations, until one or more conditions are satisfied. The one or more conditions can include a threshold quantity of iterations, convergence of the difference model(s) 160, processing of all real episode data instances, and/or other condition(s). Through multiple iterations, the difference model(s) 160 are iteratively improved, in view of losses based on corresponding modified simulated state data instances and ground truth state data instances. Upon satisfaction of the one or more conditions, the most recently updated difference model(s) 160 can be considered trained.

When the difference model(s) 160 are considered to be trained (e.g., condition(s) satisfied), the simulator 120 can then be utilized to perform new simulated episodes, and simulated state data that is generated during those episodes can be modified utilizing the difference model(s) 160 as described herein. The modified simulated state data can be that which is utilized in updating the simulator 120 in performance of the new simulated episodes, and that upon which losses and/or rewards are determined during training. Accordingly, the modified simulated state data can be utilized as simulated training data 152, and utilized by training engine 145 in training of one or more machine learning models 160. For example, the training engine 145 can process simulated training data 152 to generate simulated training example input and simulated training example output, process the simulated training example input of the simulated training example using one of the machine learning model(s) 160, generate a predicted output based on the processing, compare the predicted output to the simulated training example output of the simulated training example, and update the machine learning model based on the comparison. For instance, determine an error based on the comparison and update the machine learning model by backpropagating the error over all or portions of the machine learning model. As another example, the training engine 145 can utilize the simulated training data 152 in training of one or more machine learning models using reinforcement learning. Additional description of some examples of utilizing trained difference model(s) 160 in training of machine learning models is provided herein (e.g., with respect to FIGS. 5 and 6).

Although some implementations are described with respect to a single real robot performing real episodes, and a single robotic simulator performing simulated episodes, that is not meant to be limiting. Multiple real robots may perform real episodes (optionally in parallel) and multiple robot simulators may simultaneously perform simulated episodes. However, for the sake of brevity, implementations disclosed herein often refer to a single real robot and a single robotic simulator.

Figure 3:
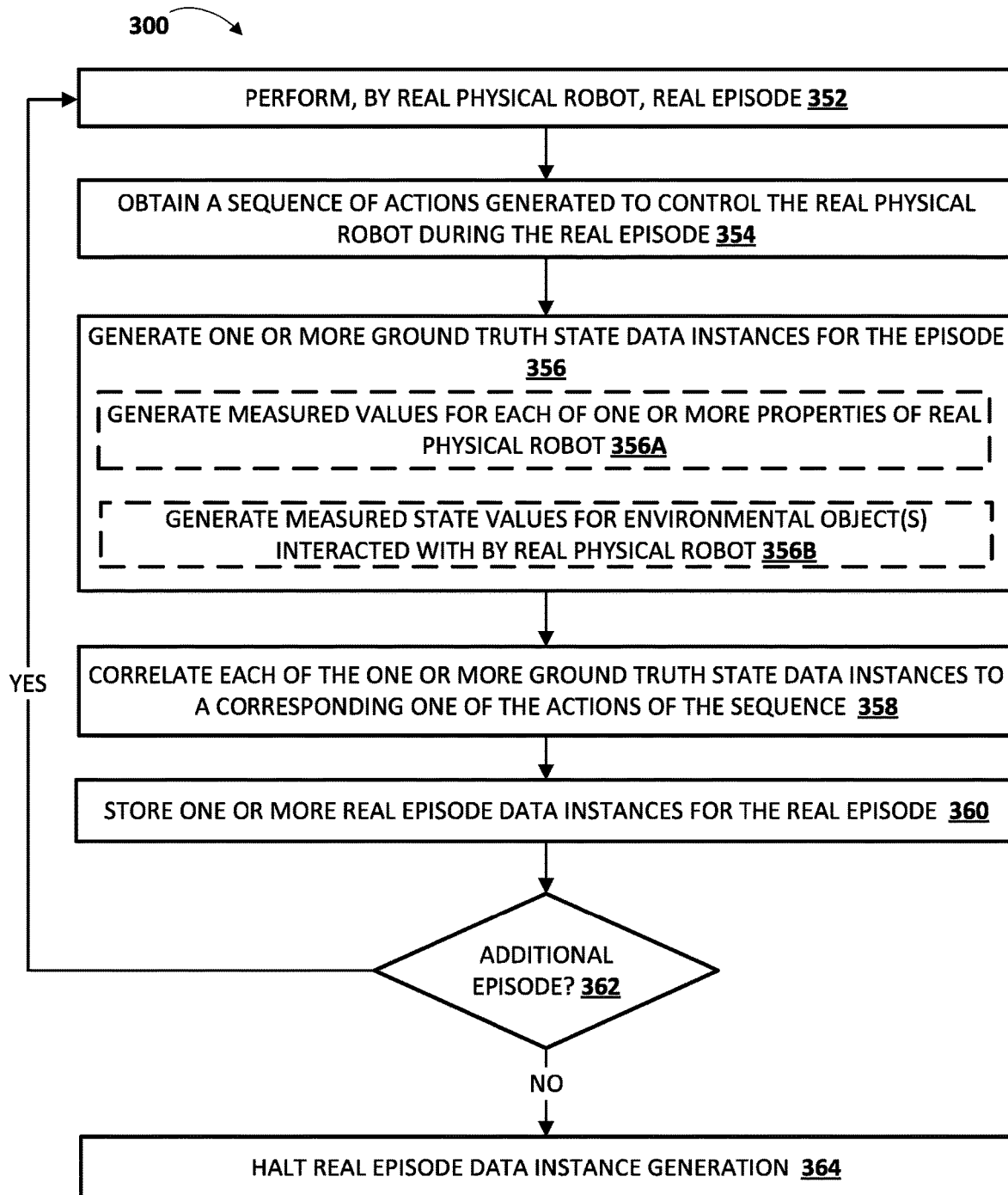
FIG. 3 is a flowchart illustrating an example method of performing real episodes using a real robot, and storing one or more real episode data instances for each of the real episodes according to implementations disclosed herein.

Turning now to FIG. 3, an example method 300 is illustrated of performing real episodes using a real robot, and storing one or more real episode data instances for each of the real episodes. For convenience, some of the operations of the method 300 are described with reference to a system that performs the operations. This system may include various components of various computer systems and/or robots, such as one or more components depicted in FIG. 1. Moreover, while operations of the method 300 are shown in a particular order, this is not meant to be limiting. One or more operations may be reordered, omitted or added.

At block 352, a real physical robot performs a real episode of a robotic task. For example, the robotic task at a given iteration of block 352 can be a movement task, a navigation task, a picking task, a placing task, a pushing task, and/or other task. In various implementations, the robotic task performed at different iterations of block 352 can vary. For example, some iterations may perform a corresponding real episode of a navigation task, other iterations may perform a corresponding real episode of a grasping task, etc. Moreover, different iterations of block 352 that perform the same robotic task can nonetheless perform different variations of the robotic task. For example, a first iteration of block 352 can perform a grasping task with first environmental objects present and using a first sequence of robotic actions, a second iteration of block 352 can perform the grasping task with second environmental objects present and using a second sequence of robotic actions, etc.

At block 354, the system obtains a sequence of actions generated to control the real physical robot during the real episode. The sequence of actions can be, for example, a sequence of velocity control commands issued to actuator(s) of the real physical robot, or other low-level control commands. The sequence of velocity control instances can include all of the actions generated during the episode, and a quantity of the actions can be dependent, for example, on a duration of the real episode and a control frequency of the real robot. For example, if 20 actions are generated every second during the episode, and the episode is 7 seconds in duration, then a sequence of 140 actions can be obtained for the episode.

At block 356, the system generates one or more ground state data instances for the episode. Block 356 can include sub-block 356A and/or sub-block 356B. The system can generate the ground state data instance(s) based on, for example, sensor data from sensor(s) of the real physical robot, vision data from a motion capture system, and/or provided human measurements.

At sub-block 356A, the system generates measured values for each of one or more properties of the robot. For example, the system can generate one or more ground state data instances that each include a measured position value for each of the actuators of the robot at a corresponding point of the episode. For instance, the system can generate a single ground truth state data instance that includes the measured position values for a single point of the episode (e.g., at the end of the episode), or can generate multiple ground truth state data instances that each include the measured position values for a corresponding point of the episode (e.g., a ground state data instance following each action of the episode).

At sub-block 356B, the system generates measured state values for each of one or more environmental objects interacted with by the real robot. For example, the system can generate one or more ground state data instances that each include a measured pose and/or velocity for each of one or more environmental objects at a corresponding point of the episode. For instance, the system can generate a single ground truth state data instance that includes the measured pose for each of the environmental objects for a single point of the episode (e.g., at the end of the episode), or can generate multiple ground truth state data instances that each include the measured pose and velocity for each of the environmental objects at a corresponding point of the episode (e.g., a ground state data instance following each action of the episode). As described herein, in various implementations the system can generate ground truth state data instances that include both generated measured values for each of one or more properties of the robot, and generated measured state values for environmental object(s) interacted with by the real physical robot.

At block 358, the system correlates each of the one or more ground state data instances to a corresponding one of the velocity control instances of the actions of the sequence. For example, the system can use timestamps to correlate ground truth state data instances to corresponding actions.

At block 360, the system stores one or more real episode data instances for the real episode. In some implementations, each real episode is utilized to generate multiple real navigation episode instances, each covering a unique portion of the real episode. As one example, a first real episode data instance can be generated based on a real episode and can include a sequence of actions from the beginning of the real episode (i.e., robot starting at t=0 seconds from a rest position) to the end of the real episode (i.e., robot has come to a rest position after performing the real episode I), along with one or more corresponding ground truth state data instances. Further, a second real episode data instance can be generated based on the same real episode, and include a sequence of actions from the beginning of the real episode to only half-way through the real episode, along with one or more corresponding ground truth state data instances. Yet further, a third real episode data instance can be generated based on the same real episode, and include a sequence of actions from one-third of the way through the real episode to two-thirds of the way through the real episode, along with one or more corresponding ground truth sate data instances. In these and other manners, a plurality of real episode data instances can be derived from a single real episode.

At block 362, the system determines whether an additional episode is to be performed by the real robot and/or another real robot. If, at an iteration of block 362, the system determines another episode is to be performed, then the method returns to block 362 to perform an additional episode. The further iteration of block 352 can utilize the same robot or another real robot, can perform the real episode for a different or the same robotic task, and can perform the real episode with different or the same environmental configuration. If, at an iteration of block 362, the system determines another episode is not to be performed, then the method can proceed to block 364 and halt real episode data instance generation.

Figure 4:
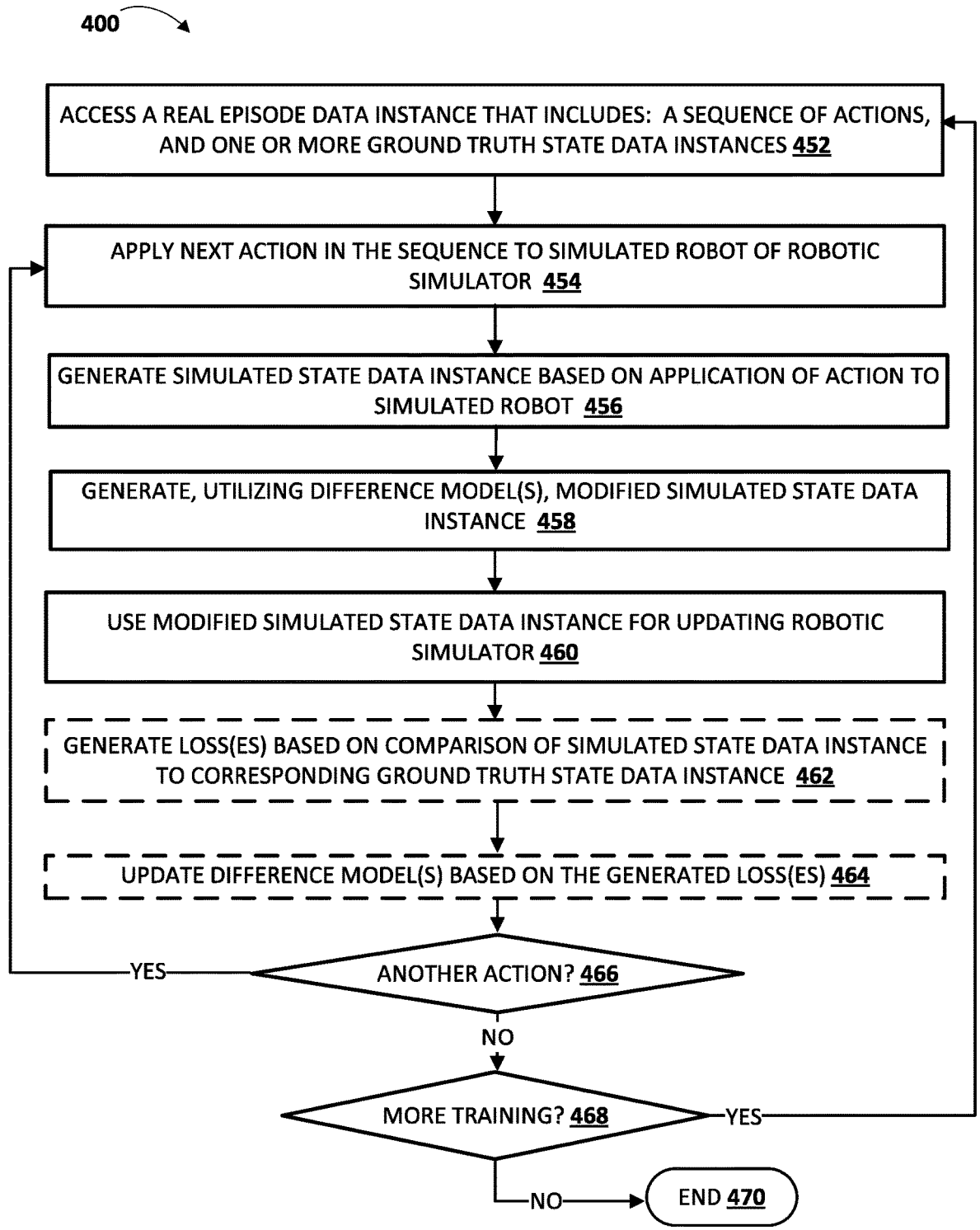
FIG. 4 is a flowchart illustrating an example method of training one or more difference model(s) according to implementations disclosed herein.

Turning now to FIG. 4, an example method 400 is illustrated of training one or more difference model(s) according to implementations disclosed herein. For convenience, the operations of the method 400 are described with reference to a system that performs the operations. This system may include various components of various computer systems, such as one or more components depicted in FIG. 1. Moreover, while operations of the method 400 are shown in a particular order, this is not meant to be limiting. One or more operations may be reordered, omitted or added.

At block 452, the system accesses a real episode data instance that includes: a sequence of actions, and one or more ground truth state data instances. For example, the system may access a real episode data instance, such as a given one of the real episode data instances stored in real episode data instances 150 of FIG. 1 and/or generated based on method 300 of FIG. 3. In some implementations, the sequence of actions are low-level commands sent to actuator (s) of a real robot during a corresponding real episode. In some implementations, the one or more ground truth state data instances each define measured robot and/or environmental state value(s) at a corresponding point of the real episode, such as poses of robot actuators at the corresponding point, a robot velocity at the corresponding point, poses of environmental object(s) at the corresponding point, etc.

At block 454, the system applies a next action, in the sequence of actions of the real episode data instance, to a simulated robot of a robotic simulator. At an initial iteration of block 454, this will be the first action in the sequence of actions. In some implementations, prior to block 454, the system can configure a simulated environment, of the robotic simulator, based on environmental data that is optionally included in the real episode data instance.

At block 456, the system generates a simulated state data instance based on application of the action to the simulated robot. For example, the system can generate the simulated data instance based on utilizing a simulated dynamic model component, simulated control model component, simulated contact model component, simulated friction model component, and/or other simulated component(s) of the robot simulator. As described herein, although the models may be configured in an attempt to replicate corresponding real world properties, certain values of the models can be incorrect and/or certain real world properties may not be modeled by the models (e.g., joint backlash, gear inertia, robot inertia). Accordingly, the simulated state data instance generated at block 456 may not conform to the "real world".

At block 458, the system generates, utilizing difference model(s), a modified simulated state data instance. For example, the system can generate difference output by processing the simulated state data instance of block 456 utilizing the difference model(s), and generate the modified state data instance based on the difference output. The difference output can be modified simulated state data that itself is the modified simulated state data instance, or can instead indicate a modification that can be applied to the simulated state data instance to generate the modified simulated state data instance. In various implementations, a single difference model utilized. In some other implementations, multiple difference models are trained, with each being utilized to process only a subset of the simulated state data instance, and with the difference output from each being utilized to generate a modification for only the subset of the simulated state data instance.

At block 460, the system uses the modified state data instance for updating the robotic simulator. For example, the system can update the state of the robotic simulator to reflect the modified simulated state data instance, instead of the originally generated simulated state data instance.

At block 462, the system generates one or more losses based on comparison of the simulated state data instance to the corresponding ground truth state data instance. Block 462 is illustrated in broken lines to indicate that it may be performed after each iteration of block 460 (e.g., if ground truth state data instances are available for each action) or may be performed after only some iterations of block 460 (e.g., for those for which a ground truth state data instance is available for a corresponding action). In some implementations of block 462, only a single loss is generated. For example, where only a single difference model is provided, a single loss can be determined. In some implementations of block 462, multiple losses are generated. For example, a first loss can be generated based on comparison of a first subset of the modified simulated state data instance (where the first subset is generated using a first difference model) to a corresponding first subset of the ground truth simulated state data instance, a second loss can be generated based on comparison of a second subset of the modified simulated state data instance (where the second subset is generated using a second difference model) to a corresponding second subset of the ground truth simulated state data instance, etc.

At block 464, the system updates the difference model(s) based on the generated loss(es) from one or more iterations of block 462. Block 464 is illustrated in broken lines to indicate that it may be performed after each iteration of block 462 (e.g., in non-batch techniques) or may be performed after only some iterations of block 460 (e.g., in batch techniques).

At block 466, the system determines whether there are any remaining actions, in the sequence of actions of the real episode data instance. If so, the system proceeds back to block 454 and applies the next action in the sequence. The system then performs another iteration of blocks 456, 458, 460, and optionally block 462 and optionally block 464.

If, at an iteration of block 466, the system determines there are not any remaining actions, in the sequence of actions, the system proceeds to block 468.

At block 468, the system determines whether to continue training the difference model(s). If, at an iteration of block 468, the system determines to continue training the difference model(s), then the system returns to block 452 and accesses an additional real episode data instance. The system can determine whether to continue training the difference model(s) based on whether one or more conditions have been satisfied. The one or more conditions can include a threshold quantity of iterations, convergence of the difference model(s), and/or other condition(s). Through multiple iterations, the continue training the difference model(s) are iteratively improved, in view of updating the difference model(s) based on the generated losses.

If, at an iteration of block 468, the system determines not to continue training the difference model(s), then the system proceeds to block 470 and the method 400 ends.

As described herein, difference model(s), once trained, can be utilized in combination with a robotic simulator to generate training data for use in training one or more machine learning models. Two non-limiting examples of such utilization are now described with respect to FIGS. 5 and 6.

Figure 5:
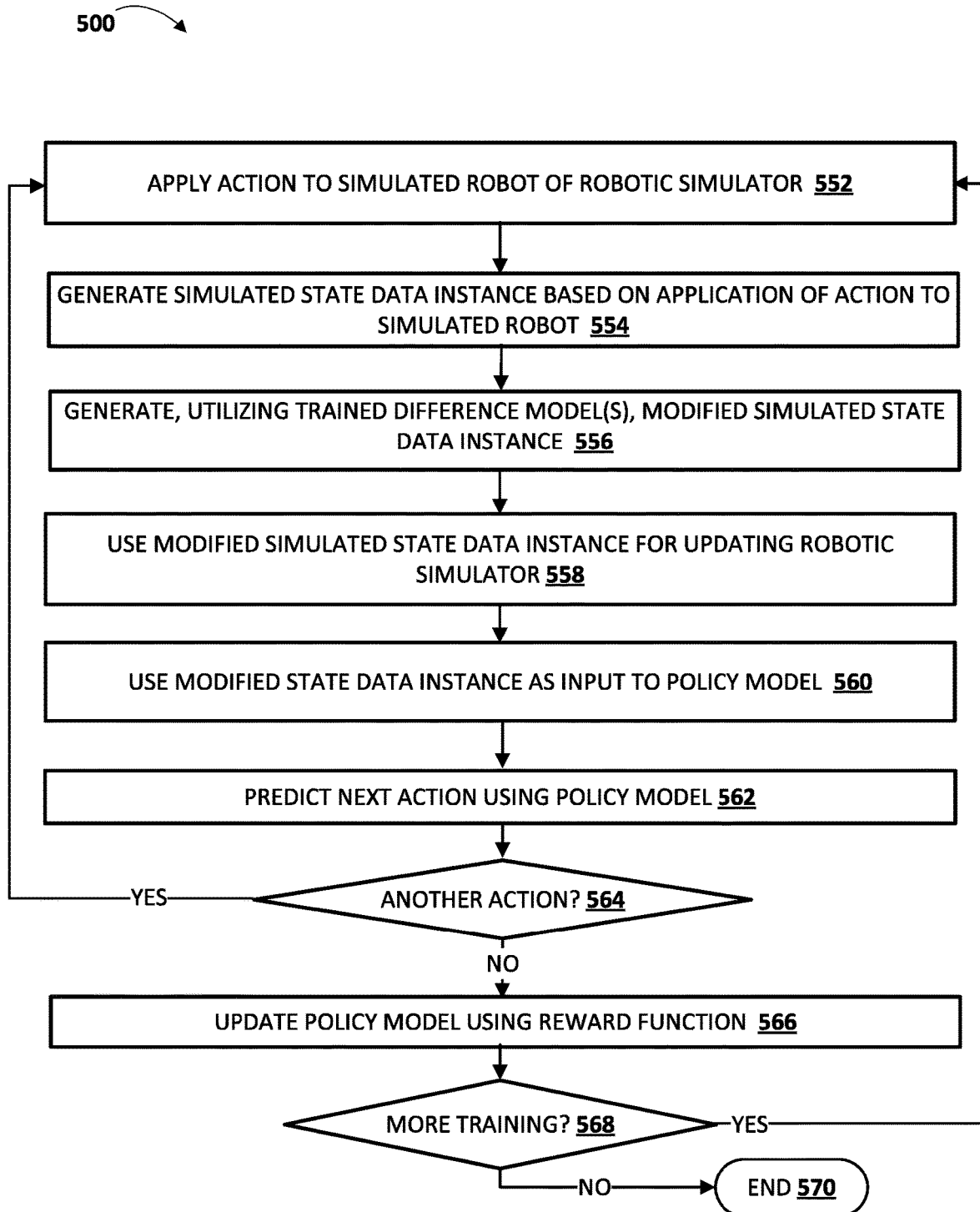
FIG. 5 is a flowchart illustrating an example method of training a policy model using modified simulated state data instances generated using trained difference model(s), according to implementations disclosed herein.

FIG. 5 is a flowchart illustrating an example method 500 of training a policy model using modified simulated state data instances generated using trained difference model(s). For convenience, the operations of the method 500 are described with reference to a system that performs the operations. This system may include various components of various computer systems, such as one or more components depicted in FIG. 1. Moreover, while operations of the method 500 are shown in a particular order, this is not meant to be limiting. One or more operations may be reordered, omitted or added.

At block 552, the system applies an action to the simulated robot of the robotic simulator. At an initial iteration of block 552 for an episode, the action can be randomly or pseudo-randomly selected, or can be selected using a policy model being trained in method 500. For example, the action can be selected using the policy model based on applying, to the policy model, a modified state data instance that is a modification (determined using trained difference model(s)) of an initial state of the robotic simulator for the episode.

At block 554, the system generates a simulated data instance based on application of the action to the simulated robot.

At block 556, the system generates, utilizing one or more trained difference model(s), a modified simulated state data instance.

At block 558, the system uses the modified simulated state data instance for updating the robotic simulator.

At block 560, the system uses the modified state data instance as input to the policy model being trained in method 500.

At block 562, the system predicts a next action using the policy model. The system can predict the next action by processing the modified state data instance using the policy model and generating, based on the processing, output that indicates the next action. For example, the output of the policy model can be an action space that indicates the probability of each of a plurality of actions, and the system can pick the next action based on it having the highest probability. As another example, the next action can be processed, along with the modified state data instance, using the policy model, and a probability generated using the policy model. Other action(s) can similarly be processed to generate corresponding probabilities, and the next action selected based on it having the highest probability.

At block 564, the system determines whether to perform another action for the episode. If so, the system proceeds back to block 552 and applies the next action predicted in the most recent iteration of block 562. If not, the system proceeds to block 566. In some implementations, the system can determine to perform another action for the episode based on a threshold quantity of actions not yet being performed for the episode, a threshold duration of time not yet expiring for the episode, or a goal condition for the episode not yet being reached.

At block 566, the system updates the policy model using a reward function. The reward function can be based on one or more of the modified simulated state data instances generated during the episode.

At block 568, the system determines whether to perform more training. If so, the system returns to block 552 and applies an initial action for a new episode. If not, the system proceeds to block 570 and the training ends. The system can determine to perform more training based on whether a threshold duration of training has occurred, based on whether a threshold quantity of training episodes have been performed, whether the policy model has converged, and/or based on other condition(s).

Figure 6:
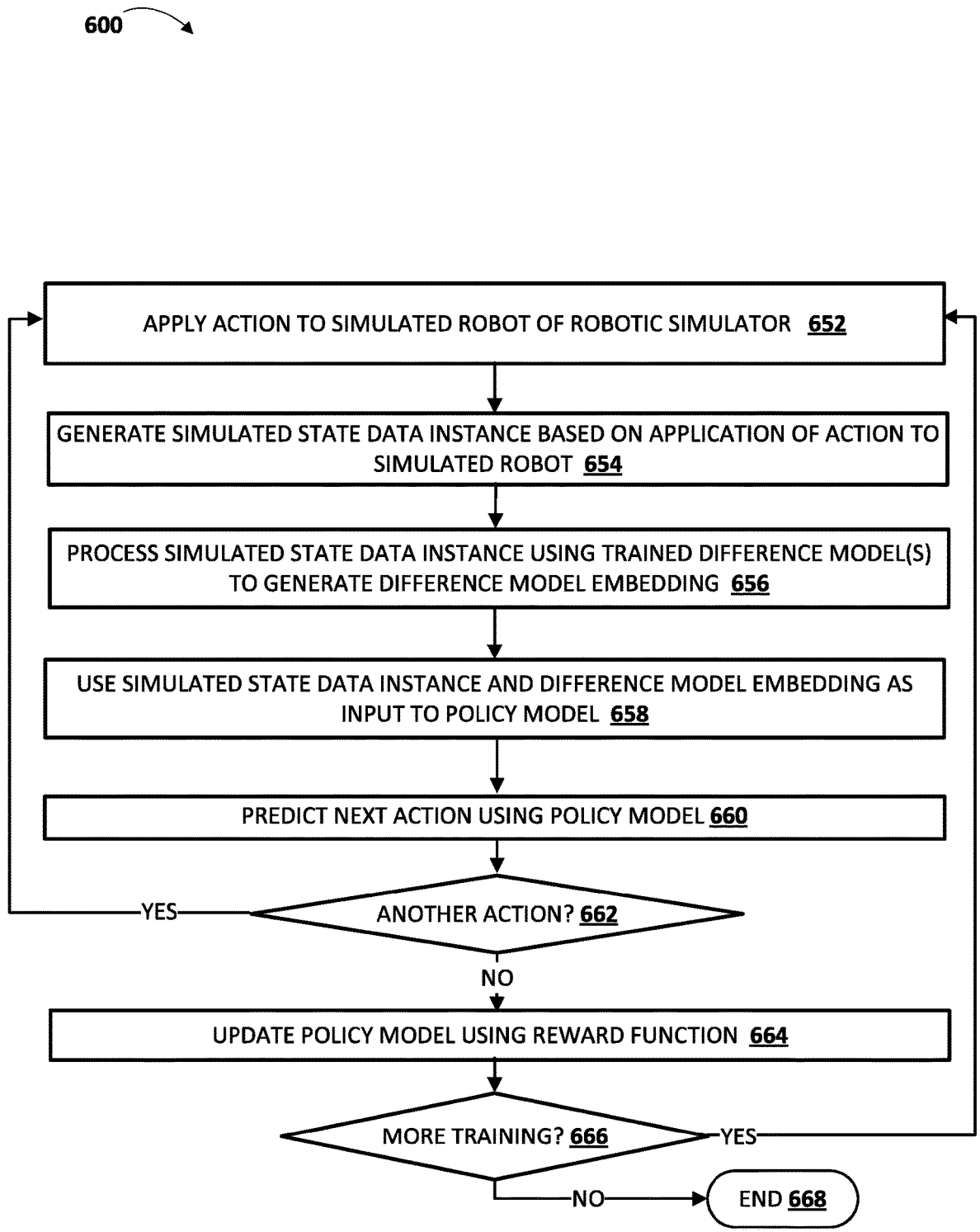
FIG. 6 is a flowchart illustrating an example method of training a policy model using simulated state data instances and difference embeddings, generated using trained difference model(s), according to implementations disclosed herein.

FIG. 6 is a flowchart illustrating an example method 600 of training a policy model using simulated state data instances and difference embeddings, generated using trained difference model(s). For convenience, the operations of the method 600 are described with reference to a system that performs the operations. This system may include various components of various computer systems, such as one or more components depicted in FIG. 1. Moreover, while operations of the method 600 are shown in a particular order, this is not meant to be limiting. One or more operations may be reordered, omitted or added.

At block 652, the system applies an action to the simulated robot of the robotic simulator. At an initial iteration of block 652 for an episode, the action can be randomly or pseudo-randomly selected, or can be selected using a policy model being trained in method 600.

At block 654, the system generates a simulated data instance based on application of the action to the simulated robot.

At block 656, the system processes the simulated state data instance, utilizing one or more trained difference model(s), to generate difference model embedding. The difference embedding can be a final embedding of a last layer of the difference model, or an embedding from another layer of the difference model At block 658, the system uses the state data instance, and the difference model embedding, as input to the policy model being trained in method 500.

At block 660, the system predicts a next action using the policy model. The system can predict the next action by processing the modified state data instance and the difference model embedding using the policy model and generating, based on the processing, output that indicates the next action. For example, the output of the policy model can be an action space that indicates the probability of each of a plurality of actions, and the system can pick the next action based on it having the highest probability.

At block 662, the system determines whether to perform another action for the episode. If so, the system proceeds back to block 652 and applies the next action predicted in the most recent iteration of block 660. If not, the system proceeds to block 664.

At block 664, the system updates the policy model using a reward function. The reward function can be based on one or more of the simulated state data instances generated during the episode.

At block 666, the system determines whether to perform more training. If so, the system returns to block 652 and applies an initial action for a new episode. If not, the system proceeds to block 668 and the training ends. The system can determine to perform more training based on whether a threshold duration of training has occurred, based on whether a threshold quantity of training episodes have been performed, whether the policy model has converged, and/or based on other condition(s).

Figure 7:
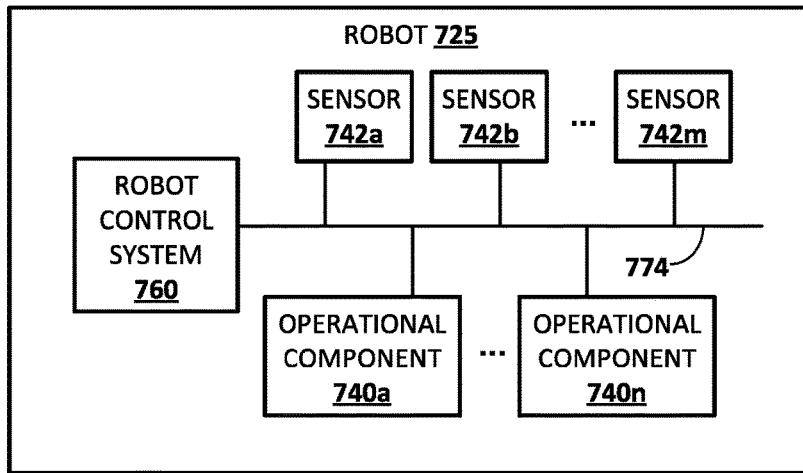
FIG. 7 schematically depicts an example architecture of a robot.

FIG. 7 schematically depicts an example architecture of a robot 725. The robot 725 includes a robot control system 760, one or more operational components 740a-740n, and one or more sensors 742a-742m. The sensors 742a-742m may include, for example, vision components, light sensors, pressure sensors, pressure wave sensors (e.g., microphones), proximity sensors, accelerometers, gyroscopes, thermometers, barometers, and so forth. While sensors 742a-742m are depicted as being integral with robot 725, this is not meant to be limiting. In some implementations, sensors 742a-742m may be located external to robot 725, e.g., as standalone units.

Operational components 740a-740n may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740a-740n, with each of the real time bursts comprising a set of one or more control commands that dictate, inter alia, the parameters of motion (if any) for each of one or more of the operational components 740a-740n. In some implementations, the robot control system 760 may perform one or more aspects of one or more methods described herein.

As described herein, in some implementations all or aspects of the control commands generated by control system 760 can be generated based on a machine learning model that is trained, in whole or in part, based on simulated training data generated according to techniques described herein. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
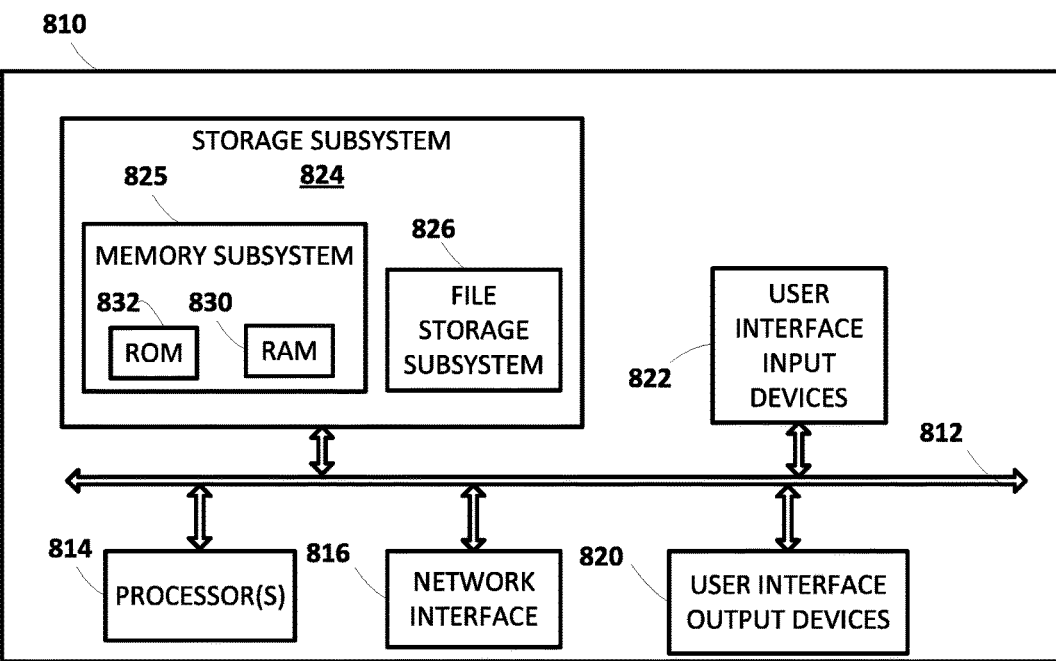
FIG. 8 schematically depicts an example architecture of a computer system.

FIG. 8 is a block diagram of an example computing device 810 that may optionally be utilized to perform one or more aspects of techniques described herein. For example, in some implementations computing device 810 may be utilized to execute simulator 120, sim difference engine 130, real episode system 110, sim training data system 140, and/or training engine 145. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

What is claimed is:

1. A method implemented by one or more processors, the method comprising:
generating a sequence of instances of observed state data, each of the instances of the observed state data of the sequence each defining one or both of:
a corresponding measured value for each of one or more properties of a real robot or simulated robot, and
a corresponding state for each of one or more real or simulated environmental objects;
sequentially processing the sequence of instances of observed state data using a trained difference model, wherein the trained difference model is a trained neural network model;
extracting a difference representation from the trained difference model after sequentially processing the sequence of observed state values, wherein extracting the difference representation from the trained difference model comprises extracting the difference representation from a layer of the difference model after sequentially processing the sequence of observed state values; and
applying the difference representation to a policy model, along with additional observed instances of observed state data, in generating predicted actions for control of the real robot or the simulated robot.

2. The method of claim 1, wherein each of the instances of the observed state data of the sequence each define both:
the corresponding measured value for each of the one or more properties of the real robot or the simulated robot, and
the corresponding state for each of the one or more real or simulated environmental objects.

3. The method of claim 1, wherein each of the instances of the observed state data of the sequence each define one or both of:
the corresponding measured value for each of the one or more properties of the real robot, and
the corresponding state for each of the one or more real environmental objects.

4. The method of claim 3, wherein the policy model is a previously trained policy model.

5. The method of claim 1, wherein each of the instances of the observed state data of the sequence each define one or both of:
the corresponding measured value for each of the one or more properties of the simulated robot, and
the corresponding state for each of the one or more simulated environmental objects.

6. The method of claim 5, further comprising training the policy model based on the instance of the observed state data and/or based on additional instances of observed state data, the additional instances of observed state data being generated based on controlling the simulated robot using the predicted actions.

7. The method of claim 1, wherein the layer is a last layer of the difference model.

8. The method of claim 1, wherein difference the layer is a given layer, of the difference model, that is in addition to a last layer of the difference model.

9. A system, comprising:
memory storing instructions;
one or more processors operable to execute the stored instructions to:
generate a sequence of instances of observed state data, each of the instances of the observed state data of the sequence each defining one or both of:
a corresponding measured value for each of one or more properties of a real robot or simulated robot, and
a corresponding state for each of one or more real or simulated environmental objects;
sequentially process the sequence of instances of observed state data using a trained difference model, wherein the trained difference model is a trained neural network model;

extract a difference representation from the trained difference model after sequentially processing the sequence of observed state values, wherein in extracting the difference representation from the trained difference model one or more of the processors are to extract the difference representation from a layer of the difference model after sequentially processing the sequence of observed state values; and apply the difference representation to a policy model, along with additional observed instances of observed state data, in generating predicted actions for control of the real robot or the simulated robot.

10. The system of claim 9, wherein each of the instances of the observed state data of the sequence each define both:
the corresponding measured value for each of the one or more properties of the real robot or the simulated robot, and
the corresponding state for each of the one or more real or simulated environmental objects.

11. The system of claim 9, wherein each of the instances of the observed state data of the sequence each define one or both of:
the corresponding measured value for each of the one or more properties of the real robot, and
the corresponding state for each of the one or more real environmental objects.

12. The system of claim 11, wherein the policy model is a previously trained policy model.

13. The system of claim 9, wherein each of the instances of the observed state data of the sequence each define one or both of:
the corresponding measured value for each of the one or more properties of the simulated robot, and
the corresponding state for each of the one or more simulated environmental objects.

14. The system of claim 13, wherein one or more of the processors are further operable to execute the stored instructions to train the policy model based on the instance of the observed state data and/or based on additional instances of observed state data, the additional instances of observed state data being generated based on controlling the simulated robot using the predicted actions.

15. The system of claim 9, wherein the layer is a last layer of the difference model.

16. The system of claim 9, wherein the layer is a given layer, of the difference model, that is in addition to a last layer of the difference model.

17. A non-transitory computer readable storage medium storing instructions that are executable by one or more processors to cause performance of a method comprising:
generating a sequence of instances of observed state data, each of the instances of the observed state data of the sequence each defining one or both of:
a corresponding measured value for each of one or more properties of a real robot or simulated robot, and
a corresponding state for each of one or more real or simulated environmental objects;
sequentially processing the sequence of instances of observed state data using a trained difference model, wherein the trained difference model is a trained neural network model;
extracting a difference representation from the trained difference model after sequentially processing the sequence of observed state values, wherein extracting the difference representation from the trained difference model comprises extracting the difference representation from a layer of the difference model after sequentially processing the sequence of observed state values; and
applying the difference representation to a policy model, along with additional observed instances of observed state data, in generating predicted actions for control of the real robot or the simulated robot.

* * * * *